United States Patent
Park et al.

(10) Patent No.: US 9,619,059 B2
(45) Date of Patent: Apr. 11, 2017

(54) STRETCHABLE DISPLAY DEVICE

(71) Applicant: SAMSUNG DISPLAY CO., LTD., Yongin-si, Gyeonggi-Do (KR)

(72) Inventors: Sang-Il Park, Yongin-si (KR); Hyun Joon Oh, Seongnam-si (KR); Hye-Jin Oh, Asan-si (KR); Jeoung Sub Lee, Seoul (KR); Min-Hoon Choi, Seoul (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/936,710

(22) Filed: Nov. 10, 2015

(65) Prior Publication Data

US 2016/0216791 A1 Jul. 28, 2016

(30) Foreign Application Priority Data

Jan. 22, 2015 (KR) .................. 10-2015-0010842

(51) Int. Cl.
*G06F 3/041* (2006.01)
*G06F 1/16* (2006.01)

(52) U.S. Cl.
CPC ............. *G06F 3/041* (2013.01); *G06F 1/16* (2013.01); *G06F 2203/04102* (2013.01)

(58) Field of Classification Search
None
See application file for complete search history.

(56) References Cited

U.S. PATENT DOCUMENTS

| 8,199,471 B2* | 6/2012 | Bemelmans | G09F 9/00 345/690 |
| 2014/0218408 A1* | 8/2014 | Kwon | G06F 3/0487 345/660 |
| 2015/0192986 A1* | 7/2015 | Yang | G06F 3/0487 345/156 |
| 2016/0077553 A1* | 3/2016 | Hyun | G06F 3/0412 345/690 |
| 2016/0124536 A1* | 5/2016 | Hyun | G06F 3/041 345/173 |
| 2016/0188098 A1* | 6/2016 | Her | G06F 3/0416 345/173 |

FOREIGN PATENT DOCUMENTS

| KR | 10-0550377 B1 | 2/2006 |
| KR | 10-1113661 B1 | 2/2012 |
| KR | 10-2014-0058762 A | 5/2014 |

* cited by examiner

*Primary Examiner* — Nicholas Lee
(74) *Attorney, Agent, or Firm* — Lee & Morse, P.C.

(57) ABSTRACT

A stretchable display device, including a stretchable display panel to display images; and a window on a touch sensing layer, the window including a soft part and a plurality of hard parts attached on a surface of the soft part, the hard parts including an attachment portion attached to the soft part and a non-attachment portion not attached to the soft part.

13 Claims, 17 Drawing Sheets

STRETCHABLE DISPLAY DEVICE

CROSS-REFERENCE TO RELATED APPLICATION

Korean Patent Application No. 10-2015-0010842, filed on Jan. 22, 2015, in the Korean Intellectual Property Office, and entitled: "Stretchable Display Device," is incorporated by reference herein in its entirety.

BACKGROUND

1. Field

Embodiments relate to a stretchable display device.

2. Description of the Related Art

A display device may display images, and a stretchable display device may extend a display area where images may be displayed.

SUMMARY

Embodiments may be realized by providing a stretchable display device, including a stretchable display panel to display images; and a window on a touch sensing layer, the window including a soft part and a plurality of hard parts attached on a surface of the soft part, the hard parts including an attachment portion attached to the soft part and a non-attachment portion not attached to the soft part.

Two or more hard parts may be partially overlapped.

The non-attachment portion may be overlapped, and the attachment portion may not be overlapped.

A plurality of reinforcing portions partially attached to the hard parts may be on the hard parts.

The hard parts may be on a same surface, and the reinforcing portion may cover a plurality of the hard parts.

The hard parts may be in a stripe form.

The hard parts may be in a lattice form.

Each of the hard parts may have a form of a polygonal plate.

The hard parts may be on a top surface of the soft part and between the soft part and the stretchable display panel.

The soft part may include a flexible material, and each of the hard parts may include a material having greater hardness than that of the soft part.

The soft part may include a material with an elastic modulus of less than about 1 GPa.

The soft part may include one of an olefin-based elastomer, a urethane-based elastomer, or a polyester-based elastomer.

Each of the hard parts may include one of a urethane acrylate, a boride based on a silicon substrate, a carbide based on a silicon substrate, aluminum nitride, silicon nitride, boron nitride, aluminum oxide, zirconium oxide, titanium oxide, beryllium oxide, or polysilazane.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
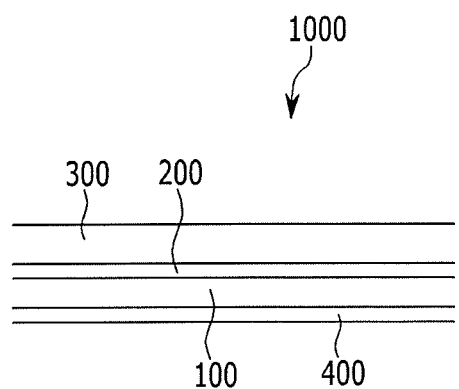
FIG. 1 illustrates a schematic cross-sectional view of a stretchable display device according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements. Further, throughout the specification, "on" implies being positioned above or below a target element and does not imply being necessarily positioned on the top on the basis of a gravity direction.

FIG. 1 illustrates a schematic cross-sectional view of a stretchable display device according to a first exemplary embodiment.

Referring to FIG. 1, a stretchable display device 1000 according to the present exemplary embodiment may include a stretchable display panel 100 displaying images, a touch sensing layer 200, a window 300, and a barrier film 400.

The stretchable display panel 100 may include a plurality of pixels displaying images processed by the stretchable display device 1000. For example, when the stretchable display device 1000 is a portable terminal such as a mobile phone, the stretchable display device 1000 may display images of a user interface (UI) or a graphical user interface (GUI) associated with a call.

The stretchable display panel 100 may include a stretchable substrate made of plastic materials having excellent heat resistance and durability such as, for example, polyethylene naphthalate (PEN), polycarbonate (PC), polyarylate (PAR), polyether imide (PEI), polyether sulfone (PES), and polyimide (PI). The stretchable display panel 100 may include a stretchable substrate made of various materials with excellent elongation.

The stretchable display panel 100 may include a plurality of thin film transistors disposed on the stretchable substrate, a plurality of gate lines, a plurality of data lines, and a plurality of organic light emitting diodes.

The touch sensing layer 200 may be disposed on the stretchable display panel. The touch sensing layer 200 may detect a touch. The touch sensing layer 200 may detect a touch when an object approaches it or actually contacts it. A touch may include not only a case in which an external object directly contacts the touch sensing layer 200, but also a case in which the external object approaches the touch sensing layer 200 or hovers in the vicinity of the touch sensing layer 200.

In the present exemplary embodiment, the touch sensing layer 200 may be disposed on the stretchable display panel 100. In an embodiment, the touch sensing layer 200 may be disposed in the stretchable display panel 100. The touch sensing layer 200 may be disposed at the stretchable substrate and attached on the stretchable display panel 100.

The window 300 may be disposed on the touch sensing layer 200, and may serve to protect the stretchable display panel 100 and the touch sensing layer 200 from an external force and an external contamination material.

A polarization layer and a resin layer may be included between the window 300 and the touch sensing layer 200. The polarization layer may decrease reflection of external light, and contrast ratio may be increase. The resin layer may be an adhesive layer for attaching the window 300.

The barrier film 400 may be disposed on a bottom surface of the stretchable display panel 100. The barrier film 400 may absorb an external impact, and the stretchable display panel 100 and the touch sensing layer 200 may be prevented from being damaged by the external impact. The barrier film 400 may be made of a material containing air to help absorb impact such as, for example, a cushion or a sponge. The barrier film 400 may serve to attach the stretchable display panel 100 to other parts, for example, to a case. The barrier film 400 may include an adhesive layer, and when the barrier film 400 includes the adhesive layer, the stretchable display device 1000 may be formed of a type of sticker.

The stretchable display panel 100, the touch sensing layer 200, the window 300, and barrier film 400 may have stretchability, and a display area thereof may be extended by an external force. The window 300 may be stretched with the stretchable display panel 100 together, and may have a hardness that may protect the stretchable display panel 100 and the touch sensing layer 200 against an external force.

A window according to an exemplary embodiment will be described in detail with reference to FIGS. 2 to 5.

Figure 2:
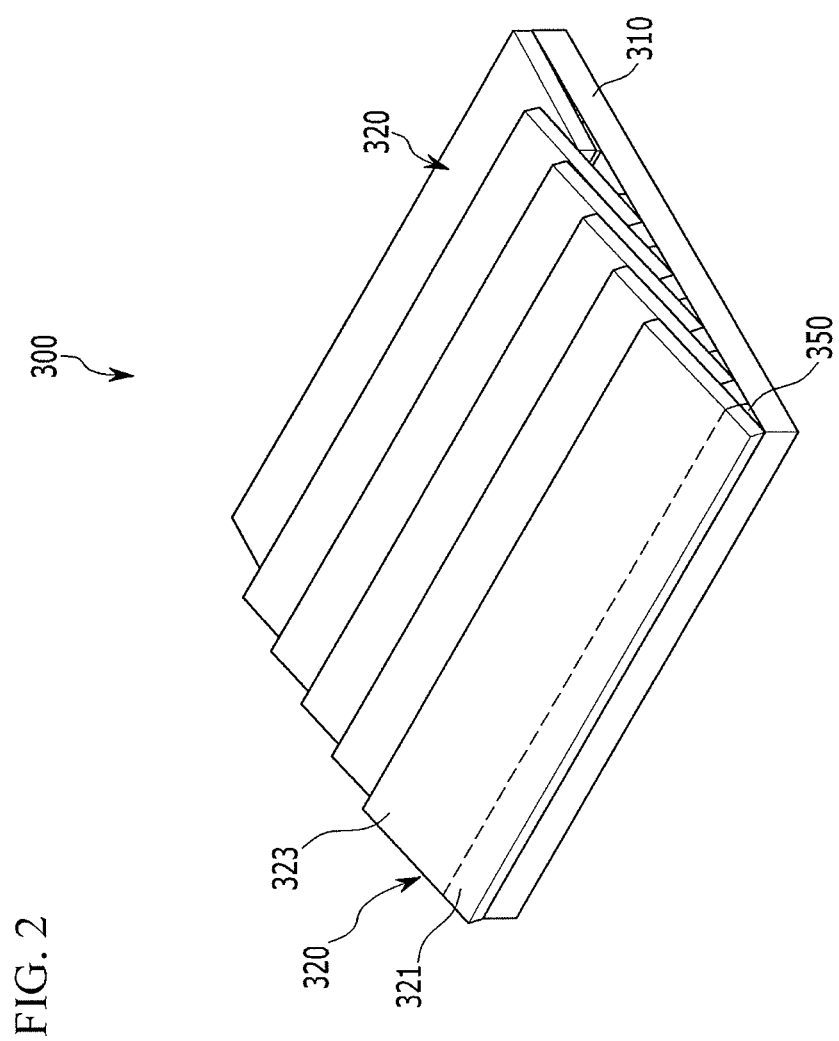
FIG. 2 illustrates a perspective view of a window according to a first exemplary embodiment.
Figure 3:
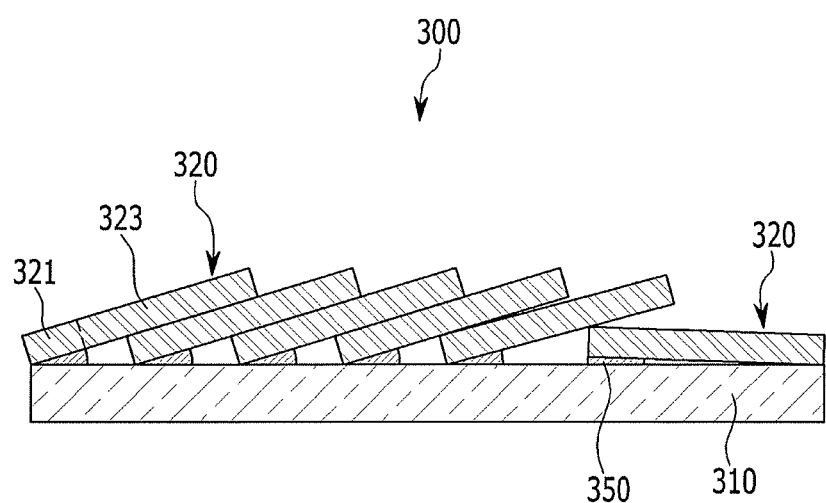
FIG. 3 illustrates a vertical cross-sectional view of a contracted state of the window according to the first exemplary embodiment.
Figure 4:
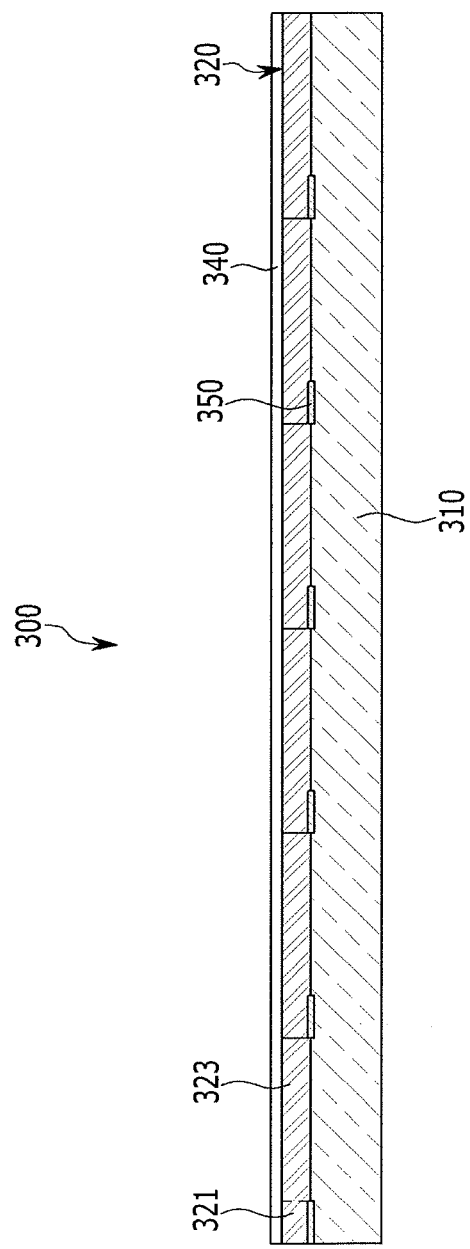
FIG. 4 illustrates a vertical cross-sectional view of an extended state of the window according to the first exemplary embodiment.

FIG. 2 illustrates a perspective view of a window according to a first exemplary embodiment, FIG. 3 illustrates a vertical cross-sectional view of a contracted state of the window according to the first exemplary embodiment, and FIG. 4 illustrates a vertical cross-sectional view of an extended state of the window according to the first exemplary embodiment.

Referring to FIGS. 2, 3, and 4, a window 300 according to the present exemplary embodiment may include a soft part 310, and a plurality of hard parts 320 attached to a surface of the soft part 310. Each of the hard parts 320 may be formed in a quadrangular shape, and the hard parts 320 may be extendedly disposed on the soft part 310 in one direction with a stripe form.

The soft part 310 may have a plate shape, and may be made of, e.g., include, a soft flexible material. The soft part 310 may be made of a material with an elastic modulus of less than about 1 GPa. For example, the soft part 310 may be made of one of an olefin-based elastomer, a urethane-based elastomer, or a polyester-based elastomer. The window 300 may include the soft part 310 made of a soft material, and may have stretchability.

The hard part 320 may be disposed on a top surface of the soft part. The hard part 320 may be made of a hard material, and may be made of a material having greater hardness than the soft part 310. For example, the hard part 320 may be made of a urethane acrylate, a boride based on a silicon substrate, a carbide based on a silicon substrate, aluminum nitride, silicon nitride, boron nitride, aluminum oxide, zirconium oxide, titanium oxide, beryllium oxide, or polysilazane. The window 300 may include the hard part 320 made of a hard material, and surface resistance against an external force may be ensured.

The window 300 may be disposed at the soft part 310 made of the soft material and a surface of the soft part 310, and may include the hard part 320 made of the hard material, and surface resistance against the external force may be ensured.

The hard part 320 may have a rectangular shape, and may include an attachment portion 321 attached to the soft part 310 and a non-attachment portion 323 not attached to the soft part 310. Two or more hard parts 320 may be disposed to be partially overlapped with each other. The attachment portions 321 may be disposed to not be overlapped, and the non-attachment portions 323 may be disposed to be overlapped. The attachment portions 321 may be separated from each other, and the non-attachment portion 323 may be disposed between the attachment portions 321.

The hard part 320 may be attached to the soft part 310 with an adhesive layer 350 therebetween, and the hard part 320 may be partially directly contacted with the adhesive layer 350. A portion of the hard part 320 directly contacted with the adhesive layer 350 may be the attachment portion 321, and a portion of the hard part 320 not directly contacted with the adhesive layer 350 may be the non-attachment portion 323. The hard part 320 may be attached on the soft part 310 by a hard coating method.

As shown in FIG. 4, when the stretchable display panel is pulled out, portions thereof not contacted with the hard parts 320 may be stretched in the soft part 310, and the hard parts 320 may not be overlapped, and may be spread in a parallel direction to the soft part 310. In a state in which the hard parts are spread, a protective film 340 may be attached on the hard part 320. After extending the window 300 to be attached to a curved surface, the protective film 340 made of a transparent material may be attached on the hard part 320, and the hard parts may be fixed.

As described above, according to the present exemplary embodiment, the hard parts 320 may include the attachment portion 321 and the non-attachment portion 323, the hard part 320 with excellent hardness may be disposed on the soft part 310, and the window 300 may be easily extended.

A window according to a second exemplary embodiment will be described with reference to FIG. 5.

Parts that are different from the first exemplary embodiment will be described, and other parts that are not described follow the first exemplary embodiment. In the second exemplary embodiment, for better comprehension and ease of description, the same constituent elements will have the same reference numerals as the first exemplary embodiment.

Figure 5:
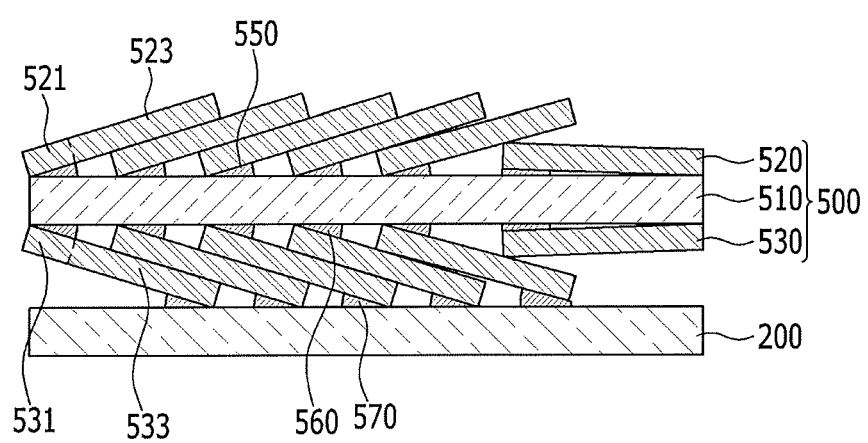
FIG. 5 illustrates a vertical cross-sectional view of a contracted state of a window according to a second exemplary embodiment.
Figure 6:
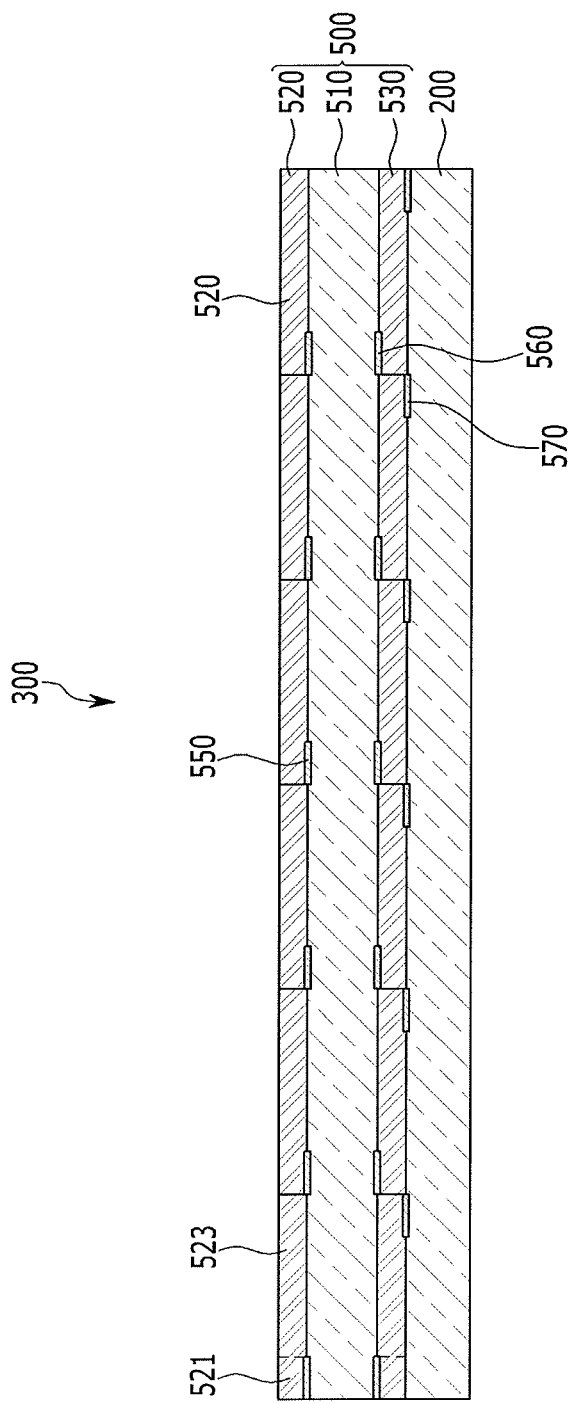
FIG. 6 illustrates a vertical cross-sectional view of an extended state of the window according to the second exemplary embodiment.

FIG. 5 illustrates a vertical cross-sectional view of a contracted state of a window according to the second exemplary embodiment, and FIG. 6 is a vertical cross-sectional view of an extended state of the window according to the second exemplary embodiment.

The window according to the second exemplary embodiment may be applied to the stretchable display device of FIG. 1.

Referring to FIGS. 5 and 6, a window 500 may include a soft part 510, and a plurality of hard parts 520 and 530 disposed on the surface of the soft part 510. The hard parts 520 and 530 may be disposed on the surfaces of the soft part 510 in a stripe form.

The soft part 510 may have a plate shape, and may be made of a soft flexible material. The soft part 510 may be made of a material with an elastic modulus of less than about 1 GPa.

The hard parts 520 and 530 may be made of a hard material, and may be made of a material having greater hardness than the soft part 510. Each of the hard parts 520 and 530 may have a rectangular shape, and respectively include attachment portions 521 and 523 attached to the soft part 510 and non-attachment portions 523 and 533 not attached to the soft part 510. The attachment portions 521 and 531 may be separated from each other, and the non-attachment portions 523 and 533 may be disposed between the attachment portions 521 and 531.

Two or more hard parts 520 and 530 may be disposed to be partially overlapped with each other. The attachment portions 521 and 531 may be disposed to not be overlapped, and the non-attachment portions 523 and 533 may be disposed to be overlapped.

The hard part 520 may be attached to a top surface of the soft part 510 with an adhesive layer 550 therebetween, and the hard part 530 may be attached to a bottom surface of the soft part 510 with an adhesive layer 560 therebetween. The hard part 530 attached to the bottom surface of the soft part 510 may be partially attached to a touch sensing layer 200 disposed below the hard part 530 with an adhesive layer 570 therebetween.

As shown in FIG. 6, when the stretchable display panel is pulled out, portions thereof not contacted with the hard parts 520 and 530 may be stretched in the soft part 510. The hard parts 520 and 530 disposed above and below the soft part 510 may be spread in a parallel direction to the soft part 510.

As the second exemplary embodiment, when the hard parts 520 and 530 are attached to the top and bottom surfaces of the soft part 510, strength of the window 500 may be further improved. When the hard part 530 disposed on the bottom surface of the soft part 510 is partially attached to the touch sensing layer 200, all of the soft part 510 and the touch sensing layer may be stretched.

A window according to a third exemplary embodiment will be described with reference to FIGS. 7 and 8.

Parts that are different from the first exemplary embodiment will be described, and other parts that are not described follow the first exemplary embodiment. In the third exemplary embodiment, for better comprehension and ease of description, the same constituent elements will have the same reference numerals as the first exemplary embodiment.

Figure 7:
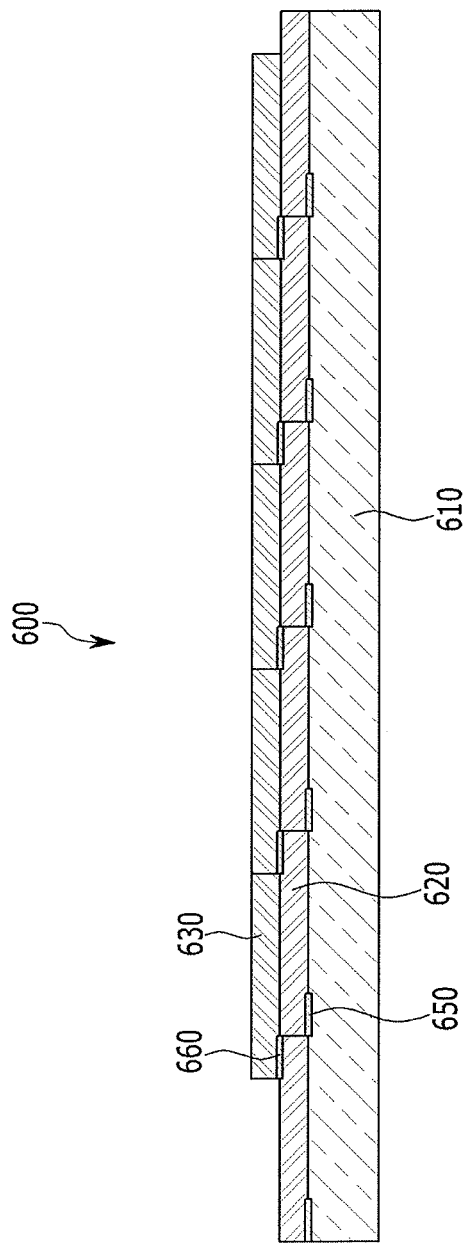
FIG. 7 illustrates a vertical cross-sectional view of a contracted state of a window according to a third exemplary embodiment.
Figure 8:
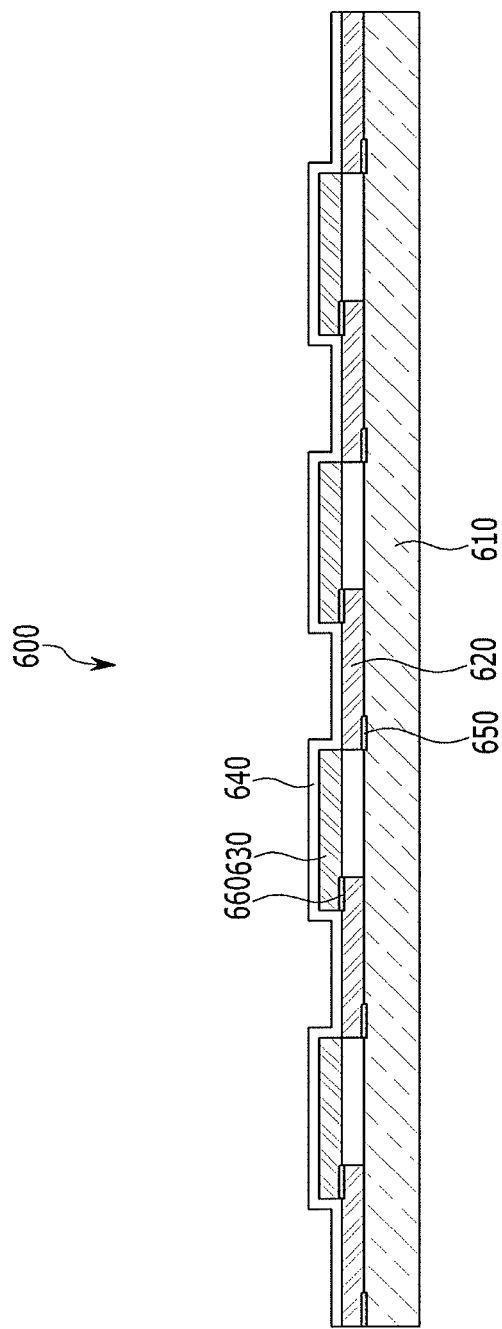
FIG. 8 illustrates a vertical cross-sectional view of an extended state of the window according to the third exemplary embodiment.

FIG. 7 illustrates a vertical cross-sectional view of a contracted state of a window according to a third exemplary embodiment, and FIG. 8 illustrates a vertical cross-sectional view of an extended state of the window according to the third exemplary embodiment.

As shown in FIGS. 7 and 8, a window 600 may include a soft part 610, and a plurality of hard parts 620 disposed on a surface of the soft part 610. The hard parts 620 may be disposed on the surfaces of the soft part 610 in a stripe form.

The soft part 610 may have a plate shape, and may be made of a soft flexible material. The soft part 610 may be made of a material with an elastic modulus of less than about 1 GPa.

The hard parts 620 may be made of a hard material, and may be made of a material having greater hardness than the soft part 610. The hard part 620 may be partially attached to the soft part 610 with an adhesive layer 650 therebetween. The plurality of hard parts 620 may be disposed on the same surface of the soft part 610 in parallel, and adjacent lateral surfaces of the hard parts 620 may be disposed to be directly contacted with each other.

A reinforcing portion that is partially attached to the hard part may be disposed on the hard part, and the reinforcing portion may be made of the same material as the hard part. The reinforcing portion may be disposed on a boundary surface between the hard parts to cover two hard parts. In an embodiment, the reinforcing portion may be attached to only one of the hard parts disposed below the reinforcing portion.

As shown in FIG. 8, when the window 600 is pulled out, portions of the window not contacted with the hard parts 620 may be stretched in the soft part 610. A gap between the hard parts 620 may occur, but a reinforcing portion 630 may be disposed above the gap, and the gap may be covered. A protective film 640 covering the hard parts 620 and the reinforcing portion 630 may be attached on a top surface of the window 600.

A window according to a fourth exemplary embodiment will be described in detail with reference to FIGS. 9A, 9B, 9C, 10, and 11.

Parts that are different from the first exemplary embodiment will be described, and other parts that are not described follow the first exemplary embodiment. In the fourth exemplary embodiment, for better comprehension and ease of description, the same constituent elements will have the same reference numerals as the first exemplary embodiment.

Figure 9A:
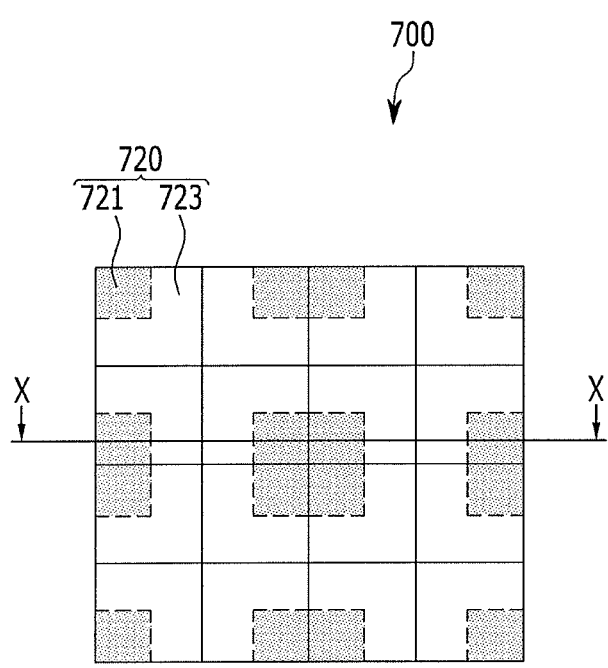
FIG. 9A illustrates a top plan view of a contracted state of a window according to a fourth exemplary embodiment.
Figure 9B:
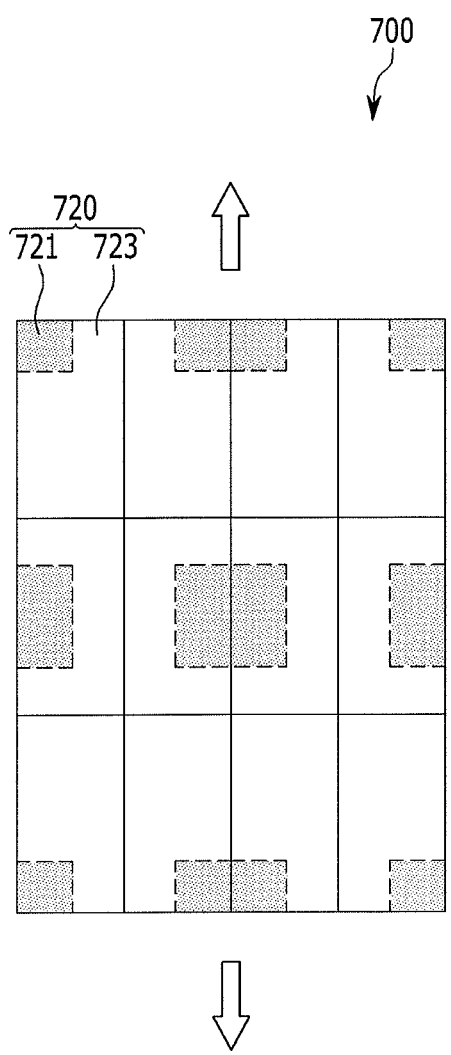
FIG. 9B illustrates a top plan view of an vertically extended state of the window according to the fourth exemplary embodiment.
Figure 9C:
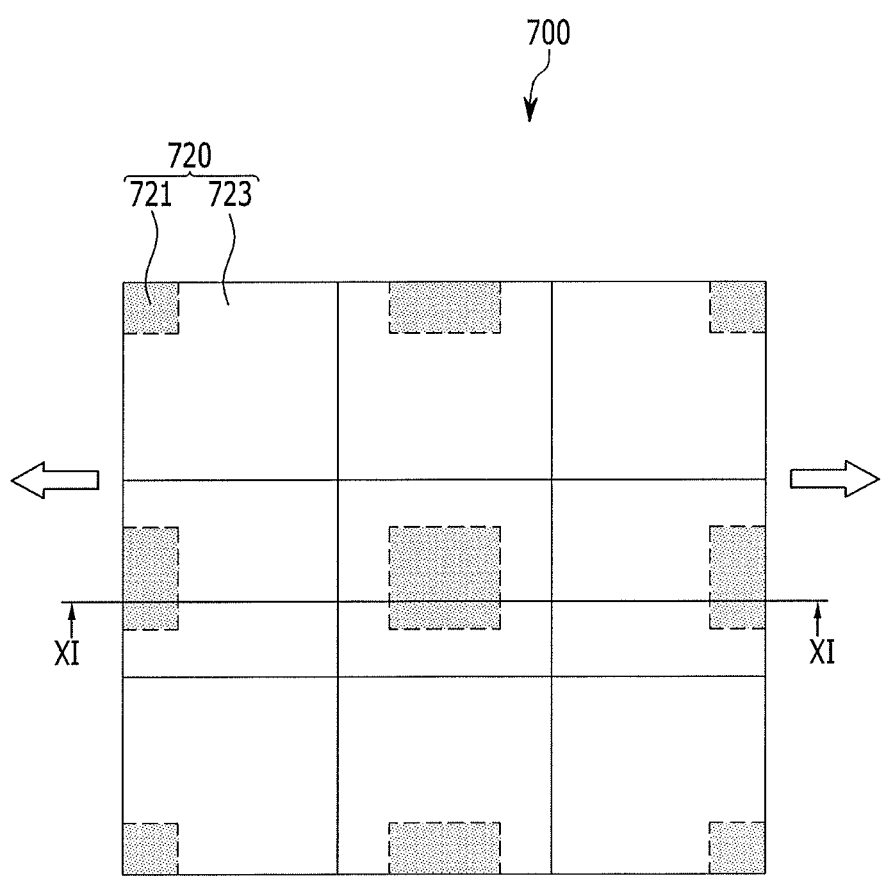
FIG. 9C illustrates a top plan view of a spread state of the window according to the fourth exemplary embodiment.
Figure 10:
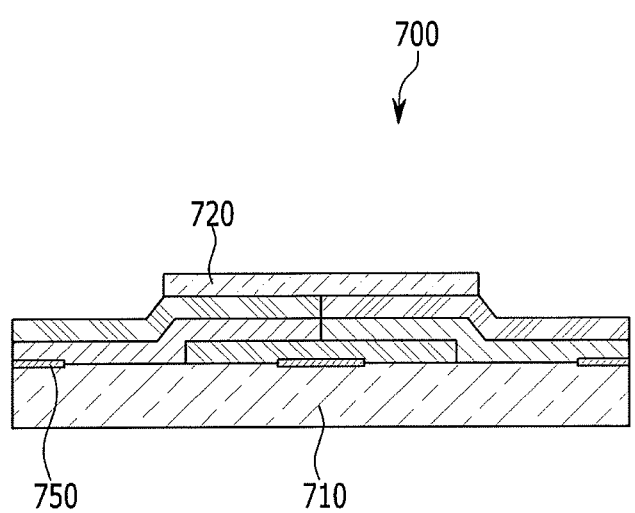
FIG. 10 illustrates a cross-sectional view of FIG. 9A taken along line X-X.
Figure 11:
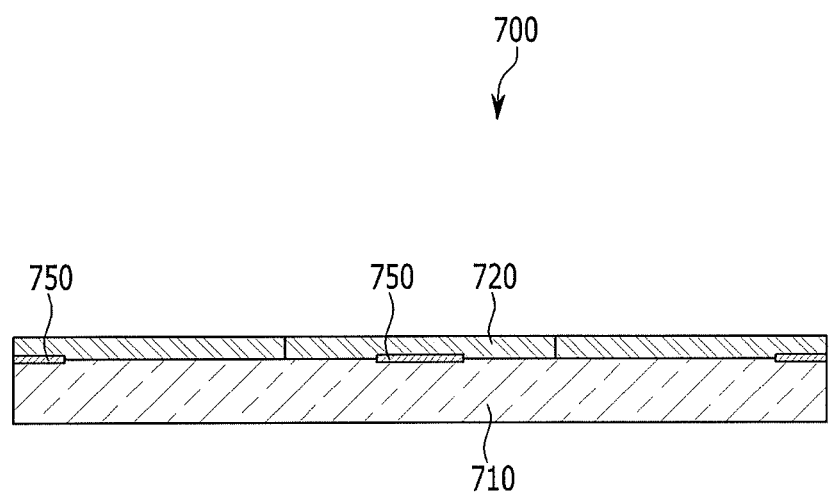
FIG. 11 illustrates a cross-sectional view of FIG. 9C taken along line XI-XI.

FIG. 9A illustrates a top plan view of a contracted state of a window according to a fourth exemplary embodiment, FIG. 9B illustrates a top plan view of an vertically extended state of the window according to the fourth exemplary embodiment, and FIG. 9C illustrates a top plan view of a spread state of the window according to the fourth exemplary embodiment. FIG. 10 illustrates a cross-sectional view of FIG. 9A taken along line X-X, and FIG. 11 illustrates a cross-sectional view of FIG. 9C taken along line XI-XI.

Referring FIGS. 9A and 10, a window 700 may include a soft part 710, and a plurality of hard parts 720 disposed on a surface of the soft part 710. The hard parts 720 may be disposed on the surface of the soft part 710 in a lattice form.

The soft part 710 may have a plate shape, and may be made of a soft flexible material. The soft part 710 may be made of a material with an elastic modulus of less than about 1 GPa.

The hard parts 720 may be made of a hard material, and may be made of a material having greater hardness than the soft part 710. Each of the hard parts 720 may have a rectangular shape, and may include an attachment portion 721 attached to the soft part 710 and a non-attachment portion 723 not attached to the soft part 710. The attachment portions 721 may be separated from each other, and the non-attachment portions 723 may be disposed between the attachment portions 721. The hard part 720 may be attached to the soft part 710 with an adhesive layer 750 therebetween, and the hard part 720 may be partially and directly contacted with the adhesive layer 750.

Two or more hard parts 720 may be disposed to be partially overlapped with each other. The hard parts 720 may have a region where two hard parts are overlapped or a region where four hard parts are overlapped. For example, four hard parts 720 may be overlapped in the middle region of the window, and two hard parts may be overlapped or the hard parts may not be overlapped in the other regions of the window.

As shown in FIG. 9B, when the window is pulled out in a vertical direction, the soft part may be stretched, and the hard parts may be spread to not be overlapped in the vertical direction, and to be disposed on the same surface.

As shown in FIGS. 9C and 11, when the window is pulled out in a horizontal direction, the soft part may be stretched, and all of the hard parts may not be overlapped, and may be disposed on the same surface.

As described above, according to exemplary embodiments, the hard parts may be disposed in a lattice form and doubly or quadruply overlapped, and the window may be extended in two directions.

A window according to a fifth exemplary embodiment will be described with reference to FIGS. 12A, 12B, FIGS. 12C, and 13.

Parts that are different from the first exemplary embodiment will be described, and other parts that are not described follow the first exemplary embodiment. In the fifth exemplary embodiment, for better comprehension and ease of description, the same constituent elements will have the same reference numerals as the first exemplary embodiment.

Figure 12A:
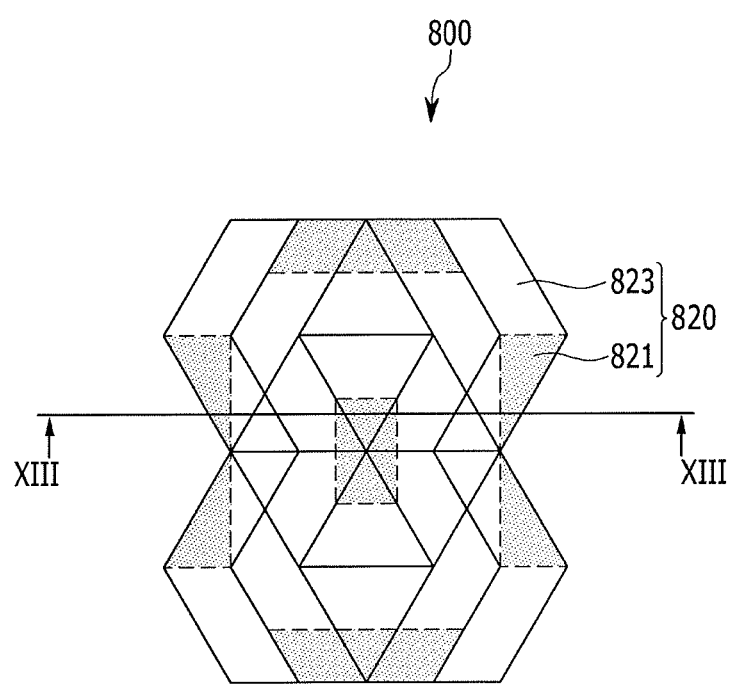
FIG. 12A illustrates a top plan view of a contracted state of a window according to a fifth exemplary embodiment.
Figure 12B:
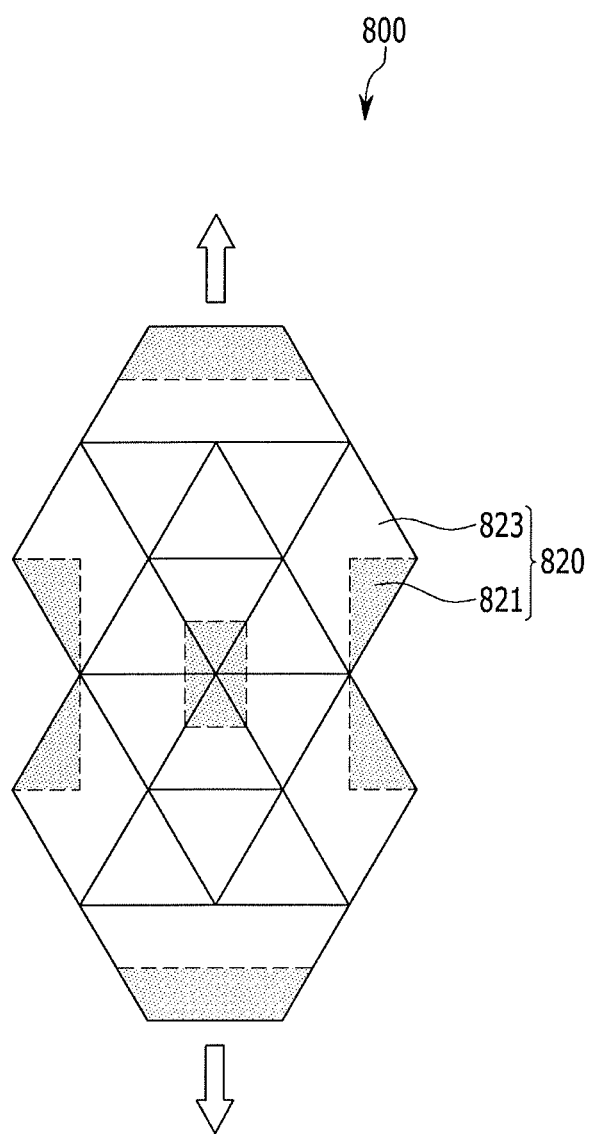
FIG. 12B illustrates a top plan view of a vertically extended state of the window according to the fifth exemplary embodiment.
Figure 12C:
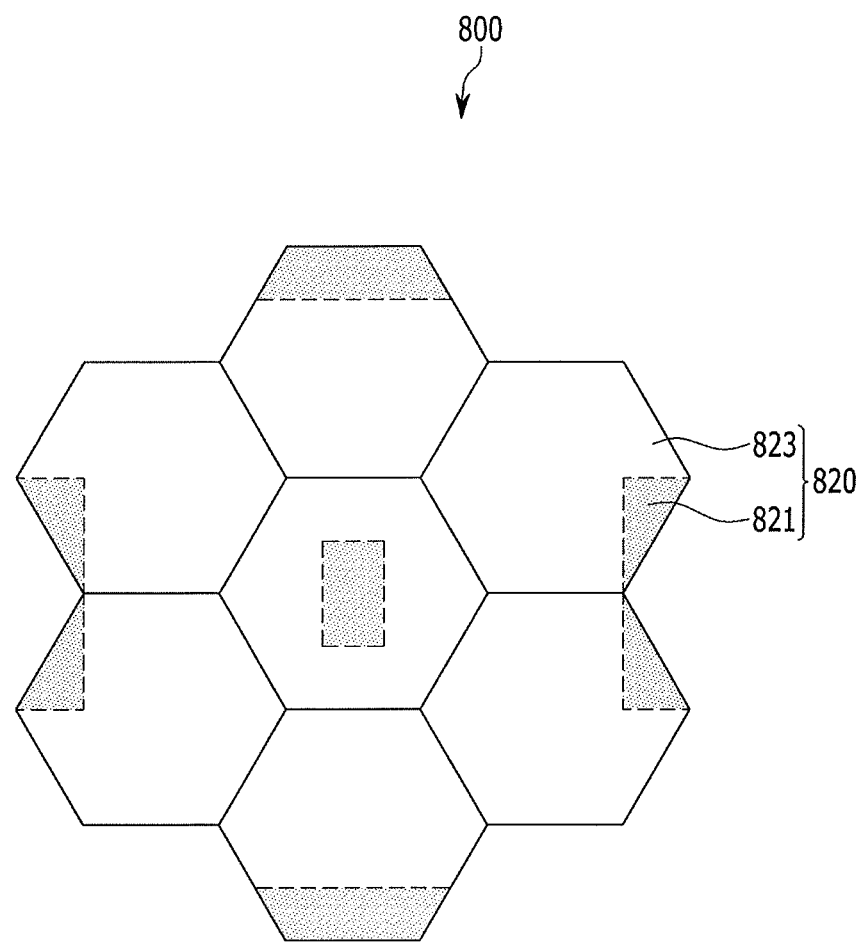
FIG. 12C illustrates a top plan view of a spread state of the window according to the fifth exemplary embodiment.
Figure 13:
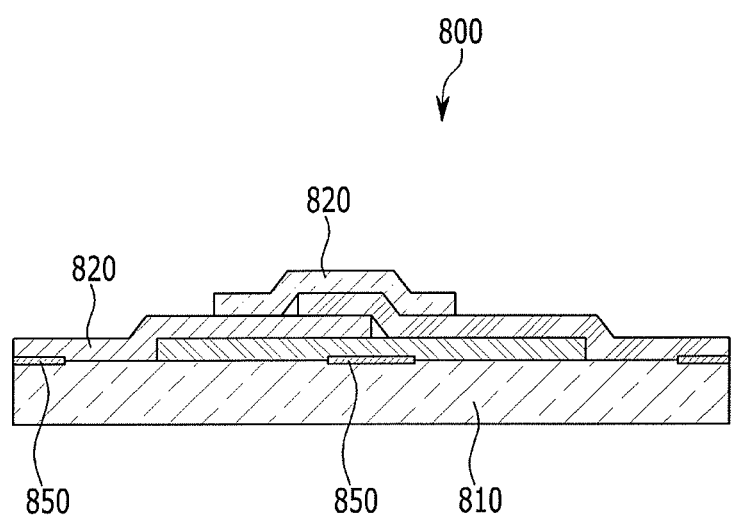
FIG. 13 illustrates a cross-sectional view of FIG. 12A taken along line XIII-XIII.

FIG. 12A illustrates a top plan view of a contracted state of the window according to the fifth exemplary embodiment, FIG. 12B illustrates a top plan view of an vertically extended state of the window according to the fifth exemplary embodiment, and FIG. 12C illustrates a top plan view of a spread state of the window according to the fifth exemplary embodiment. FIG. 13 is a cross-sectional view of FIG. 12A taken along is foline XIII-XIII.

Referring to FIGS. 12A and 13, a window 800 may include a soft part 810, and a plurality of hard parts 820 disposed on a surface of the soft part 810. The hard parts 820 may be disposed to be overlapped on the surface of the soft part 810.

The soft part 810 may have a plate shape, and may be made of a soft flexible material. The soft part 810 may be made of a material with an elastic modulus of less than about 1 GPa.

The hard parts 820 may be made of a hard material, and may be made of a material having greater hardness than the soft part 810. Each of the hard parts 820 may be formed of a hexagonal plate, and may include an attachment portion 821 attached to the soft part 810 and a non-attachment portion 823 not attached to the soft part 810. The attachment portions 821 may be separated from each other, and the non-attachment portions 823 may be disposed between the attachment portions 821. The hard part 820 may be attached to the soft part 810 with an adhesive layer 850 therebetween, and the hard part 820 may be partially and directly contacted with the adhesive layer 850.

Two or more hard parts 820 may be disposed to be partially overlapped with each other. The hard parts 820 may have a region where two hard parts are overlapped, a region where three hard parts are overlapped, or a region where four hard parts are overlapped. For example, four hard parts 820 may be overlapped in the middle region of the window, and two or three hard parts may be overlapped or the hard parts may not be overlapped in the other regions of the window.

As shown in FIG. 12B, when the window 800 is pulled out in a vertical direction, the soft part 810 may be stretched, and the hard parts 820 may be moved in the vertical direction.

As shown in FIGS. 12C and 11, when the window 800 is pulled out in a horizontal direction, the soft part 810 may be stretched, and all of the hard parts 820 may not be overlapped, and may be spread to be disposed on the same surface. As described above, according to the fifth exemplary embodiment, when the soft part 810 is stretched, the overlapped hard parts 820 may be moved, and the window 800 may be extended in two directions.

By way of summation and review, a stretchable display device may include a window for protecting it from an external impact, and the window may have extendable stretchability as well.

When the window is made of soft materials with flexibility, the window may not protect the stretchable display device from external impact, and when the window is made of materials with high hardness, the window may have poor stretchability.

Provided is a stretchable display device including a window that may not only have stretchability, but that may also protect the stretchable display device from an external impact.

According to the exemplary embodiment, the stretchable display device may include a hard part formed of an attachment portion and a non-attachment portion, and stretchability and surface resistance against an external force may be ensured.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A stretchable display device, comprising:
a stretchable display panel to display images; and
a window on a touch sensing layer,
the window including a soft part and a plurality of hard parts attached on a surface of the soft part, the hard parts including an attachment portion attached to the soft part and a non-attachment portion not attached to the soft part.

2. The stretchable display device as claimed in claim 1, wherein two or more hard parts are partially overlapped.

3. The stretchable display device as claimed in claim 2, wherein:
the non-attachment portion is overlapped, and
the attachment portion is not overlapped.

4. The stretchable display device as claimed in claim 1, wherein a plurality of reinforcing portions partially attached to the hard parts are on the hard parts.

5. The stretchable display device as claimed in claim 4, wherein the hard parts are on a same surface, and the reinforcing portion covers a plurality of the hard parts.

6. The stretchable display device as claimed in claim 1, wherein the hard parts are in a stripe form.

7. The stretchable display device as claimed in claim 1, wherein the hard parts are in a lattice form.

8. The stretchable display device as claimed in claim 1, wherein each of the hard parts has a form of a polygonal plate.

9. The stretchable display device as claimed in claim 1, wherein the hard parts are on a top surface of the soft part and between the soft part and the stretchable display panel.

10. The stretchable display device as claimed in claim 1, wherein:
the soft part includes a flexible material, and
each of the hard parts includes a material having greater hardness than that of the soft part.

11. The stretchable display device as claimed in claim 9, wherein the soft part includes a material with an elastic modulus of less than about 1 GPa.

12. The stretchable display device as claimed in claim 1, wherein the soft part includes one of an olefin-based elastomer, a urethane-based elastomer, or a polyester-based elastomer.

13. The stretchable display device as claimed in claim 1, wherein each of the hard parts includes one of a urethane acrylate, a boride based on a silicon substrate, a carbide based on a silicon substrate, aluminum nitride, silicon nitride, boron nitride, aluminum oxide, zirconium oxide, titanium oxide, beryllium oxide, or polysilazane.

* * * * *